US009544561B2

(12) United States Patent
Henninen et al.

(10) Patent No.: US 9,544,561 B2
(45) Date of Patent: Jan. 10, 2017

(54) INTERACTIVE PROJECTOR AND INTERACTIVE PROJECTION SYSTEM

(71) Applicant: Seiko Epson Corporation, Tokyo (JP)

(72) Inventors: Svein Henninen, Trondheim (NO); Kenji Tanaka, Trondheim (NO)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/079,018

(22) Filed: Mar. 23, 2016

(65) Prior Publication Data

US 2016/0286191 A1    Sep. 29, 2016

(30) Foreign Application Priority Data

Mar. 27, 2015  (JP) ................. 2015-065668

(51) Int. Cl.
| H04N 9/31 | (2006.01) |
| H04N 9/74 | (2006.01) |
| G06F 3/03 | (2006.01) |
| G06F 3/0346 | (2013.01) |

(52) U.S. Cl.
CPC .............. *H04N 9/74* (2013.01); *G06F 3/0325* (2013.01); *G06F 3/0346* (2013.01); *H04N 9/31* (2013.01)

(58) Field of Classification Search
CPC .......... H04N 9/74; H04N 9/31; H04N 9/3194; H04N 9/3179; H04N 9/3185; G06F 3/0325; G06F 3/0346; G06F 3/033; G06F 3/0386; G06F 3/03542; G06F 3/0425

USPC ......... 348/744–747, 115, 602, 601; 345/156, 345/157, 175, 179, 180, 182, 183; 353/42
See application file for complete search history.

(56) References Cited

U.S. PATENT DOCUMENTS

| 2011/0134080 A1* | 6/2011 | Kiyose | ................. G06F 3/0428 345/175 |
| 2013/0162538 A1* | 6/2013 | Ichieda | ................. G06F 3/033 345/163 |

FOREIGN PATENT DOCUMENTS

JP    2012-150636 A    8/2012

* cited by examiner

*Primary Examiner* — Sherrie Hsia
(74) *Attorney, Agent, or Firm* — ALG Intellectual Property, LLC

(57) ABSTRACT

An interactive projector includes a projection section, a detection light irradiation section, an imaging section, and a position detection section adapted to detect a position of the pointing element with respect to the projected screen based on an image, which is taken by the imaging section and includes the pointing element. The detection light irradiation section is disposed so that (i) first contrast in an image taken in the state in which the tip of the pointing element has contact with one position outside the projected screen is lower than a threshold value set in advance, and (ii) second contrast in an image taken in the state in which the tip of the pointing element has contact with an arbitrary position in the projected screen is higher than a threshold value set in advance for distinguishing the pointing element from the projected screen.

4 Claims, 7 Drawing Sheets

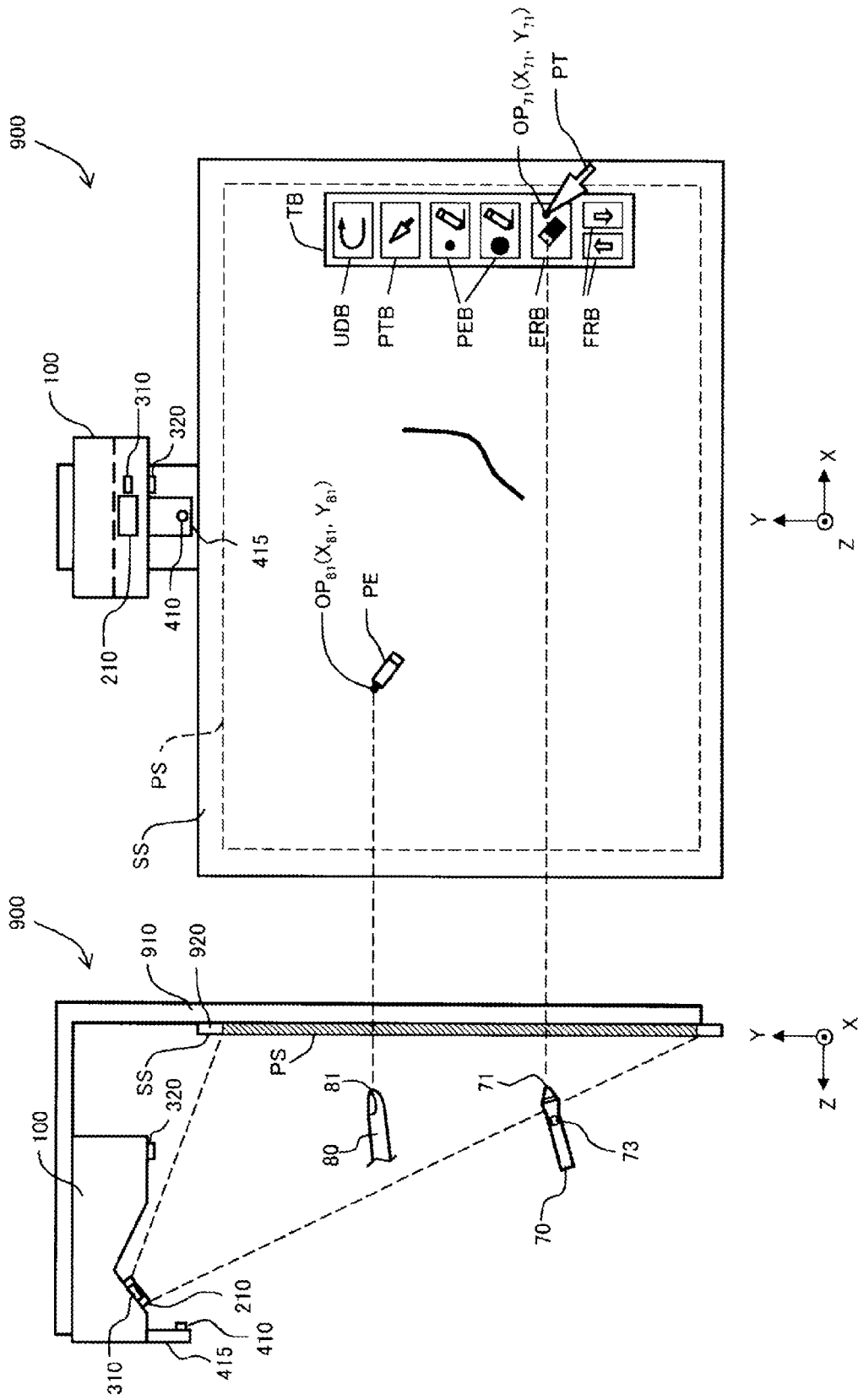

INTERACTIVE PROJECTOR AND INTERACTIVE PROJECTION SYSTEM

The entire disclosure of Japanese Patent Application No. 2015-065668, filed Mar. 27, 2015 is expressly incorporated by reference herein.

BACKGROUND

1. Technical Field

The present invention relates to an interactive projector and a system thereof each capable of receiving an instruction of the user to a projected screen with a pointing element.

2. Related Art

JP-A-2012-150636 discloses a projection display device (projector) capable of projecting a projected screen on a screen, and at the same time taking an image, which includes an object such as a finger, with a camera to detect the position of the object using the taken image. The object such as a finger is used as a pointing body for making an instruction to the projection screen. In other words, when the tip of the object has contact with the screen, the projector recognizes that a predetermined instruction such as drawing is input to the projected screen, and then redraws the projected screen in accordance with the instruction. Therefore, it is possible for the user to input a variety of instructions using the projected screen as a user interface. The projector of the type capable of using the projected screen on the screen as an inputting user interface as described above is referred to as an "interactive projector." Further, the object used for making an instruction to the projected screen is referred to as a "pointing element."

In the interactive projector, in order to detect the position of the pointing element, the pointing element is irradiated with detection light such as an infrared ray, and the detection light reflected by the pointing element is imaged by the camera. When detecting the position of the pointing element from the image thus taken, where in the image the pointing element is located is determined using a difference in contrast between the pointing element and the projection image. Therefore, in the image taken by the camera, it is desired that the difference in contrast between the pointing element and the projection image is sufficiently high.

However, the inventors of the invention have found out the fact that it is not necessarily easy to sufficiently increase the contrast between the pointing element and the projection image, and in some cases, the contrast cannot sufficiently be obtained depending on the way of applying the detection light.

SUMMARY

An advantage of some aspects of the invention is to solve at least a part of the problems described above, and the invention can be implemented as the following aspects or application examples.

(1) An aspect of the invention provides an interactive projector capable of receiving an instruction of a user to a projected screen with a pointing element. The interactive projector includes a projection section adapted to project the projected screen on a screen surface, a detection light irradiation section adapted to emit detection light used for detection of the pointing element toward an area of the projected screen, an imaging section adapted to receive light in a wavelength range including a wavelength of the detection light to take an image of the area of the projected screen, and a position detection section adapted to detect a position of the pointing element with respect to the projected screen based on an image, which is taken by the imaging section and includes the pointing element. The detection light irradiation section is disposed so that (i) in a case in which the detection light is emitted from the detection light irradiation section in a state in which a tip of the pointing element has contact with at least one position located outside the projected screen on a same plane as the projected screen, first contrast between the pointing element and an area outside the projected screen in an image taken by the imaging section is lower than a threshold value set in advance for distinguishing the pointing element from the projected screen, and (ii) in a case in which the detection light is emitted from the detection light irradiation section in a state in which the tip of the pointing element has contact with an arbitrary position in the projected screen, second contrast between the pointing element and the area of the projected screen in the image taken by the imaging section is higher than a threshold value set in advance for distinguishing the pointing element from the projected screen.

According to this interactive projector, since the second contrast between the pointing element and the projected screen becomes higher than the threshold value set in advance at any positions in the projected screen, the position of the pointing element with respect to the projected screen can be determined at any positions in the projected screen.

(2) In the interactive projector described above, the second contrast may be contrast representing a state in which the projected screen is brighter than the area of the pointing element in the image taken by the imaging section, and the detection light irradiation section may be disposed so that the second contrast becomes higher in a case of irradiating the projected screen with external light including a wavelength of the detection light than in a case in which the external light is absent.

According to this configuration, the position of the pointing element with respect to the projected screen can be determined even in the case in which the external light exists.

(3) In the interactive projector described above, the detection light may be near infrared light.

According to this configuration, since the position of the pointing element is detected using the detection light as the near infrared light, the position of the pointing element with respect to the projected screen can be determined without spoiling the easiness in observing the image projected by the projection section on the projected screen.

The invention can be implemented in a variety of configurations such as a system including either one or both of the screen and the light-emitting pointing element and the interactive projector, a control method or a control device of the interactive projector, a computer program for implementing the method or the functions of the device, or a non-transitory storage medium recoding the computer program.

BRIEF DESCRIPTION OF THE DRAWINGS

The invention will be described with reference to the accompanying drawings, wherein like numbers reference like elements.

FIGS. 4A and 4B are explanatory diagrams showing an appearance of an operation using the light-emitting pointing element and a non-light-emitting pointing element.

DESCRIPTION OF AN EXEMPLARY EMBODIMENT

A. General Description of System

Figure 1:
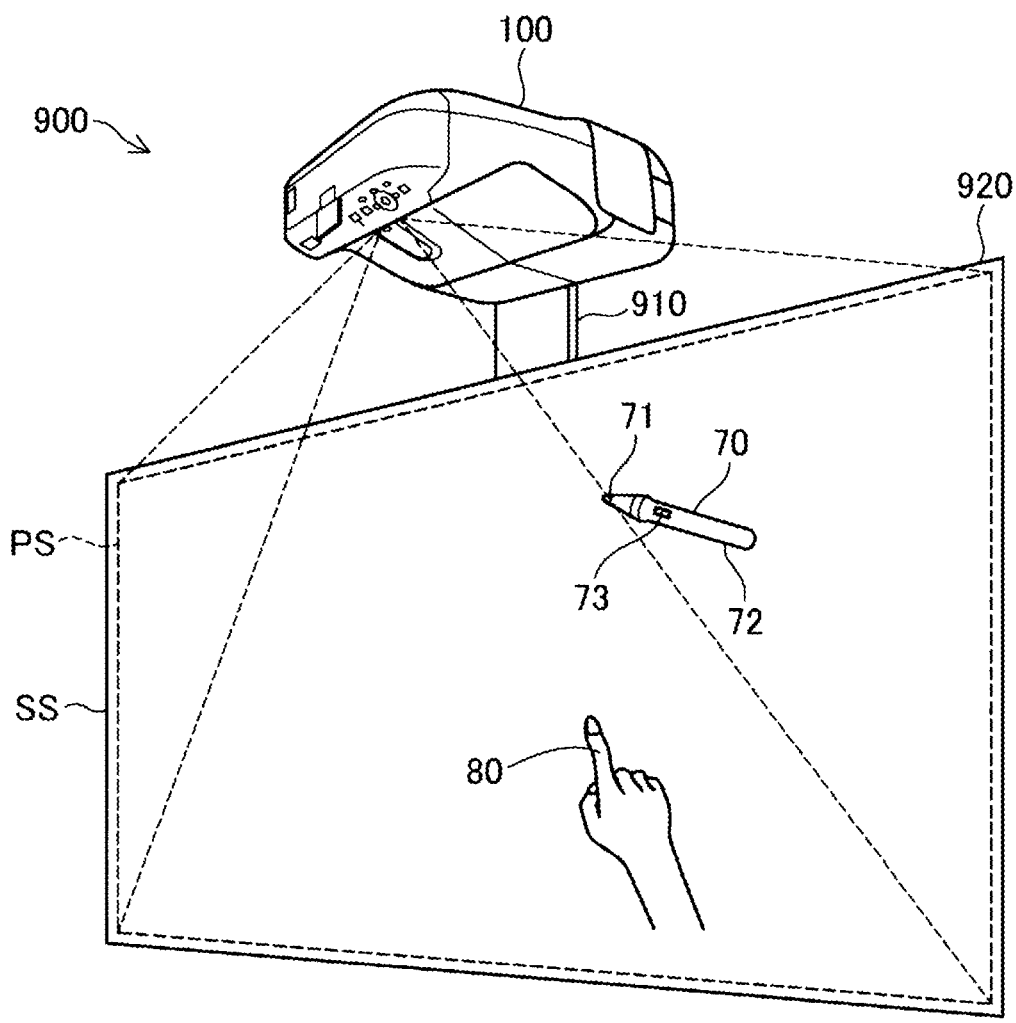
FIG. 1 is a perspective view of an interactive projection system.

FIG. 1 is a perspective view of an interactive projection system 900 according to an embodiment of the invention. The system 900 has an interactive projector 100, a screen plate 920, and a light-emitting pointing element 70. The front surface of the screen plate 920 is used as a projection screen surface SS. The projector 100 is fixed in front of and above the screen plate 920 with a support member 910. It should be noted that although the projection screen surface SS is vertically disposed in FIG. 1, it is also possible to use the system 900 with the projection screen surface SS disposed horizontally.

The projector 100 projects a projected screen PS on the projection screen surface SS. The projected screen PS normally includes an image drawn in the projector 100. In the case in which the image drawn in the projector 100 does not exist, the light is emitted on the projected screen PS from the projector 100 to display a white image. In the present specification, the "projection screen surface SS" (or a "screen surface SS") denotes a surface of a member on which the image is projected. Further, the "projected screen PS" denotes an area of an image projected on the projection screen surface SS by the projector 100. Normally, the projected screen PS is projected on a part of the projection screen surface SS.

The light-emitting pointing element 70 is a pen-shaped pointing element having a tip portion 71 capable of emitting light, a sleeve section 72 held by the user, and a button switch 73 provided to the sleeve section 72. The configuration and the function of the light-emitting pointing element 70 will be described later. In the system 900, one or more non-light-emitting pointing elements 80 (e.g., a non-light-emitting pen or a finger) can be used together with one or more light-emitting pointing elements 70.

Figure 2B:
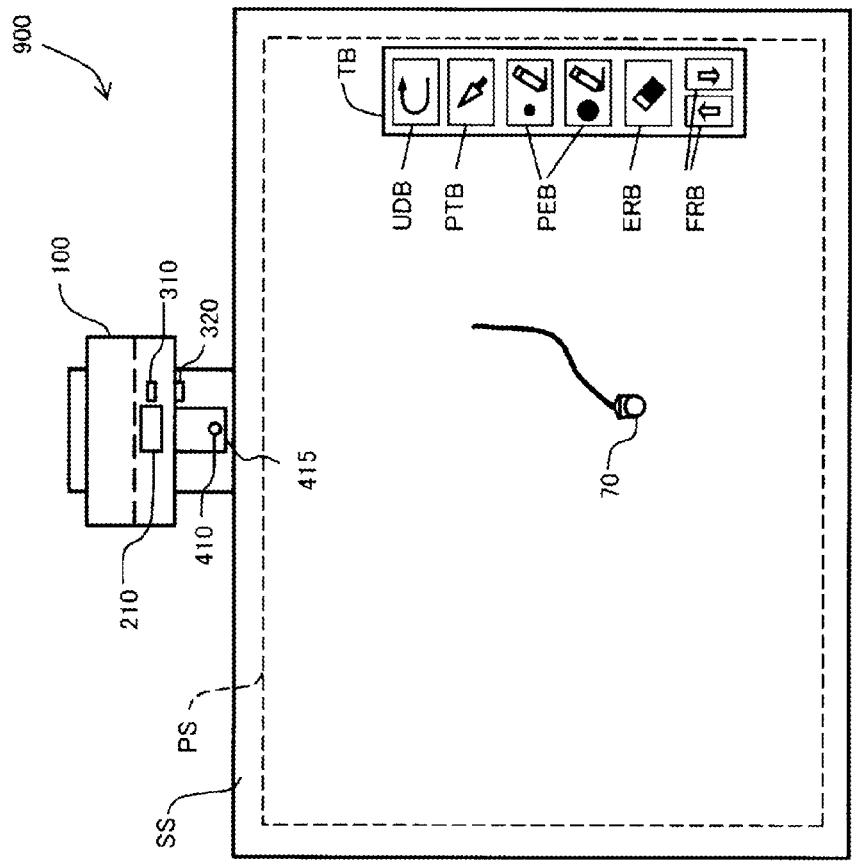
FIGS. 2A and 2B are a side view and a front view, respectively, of the interactive projection system.
Figure 2A:
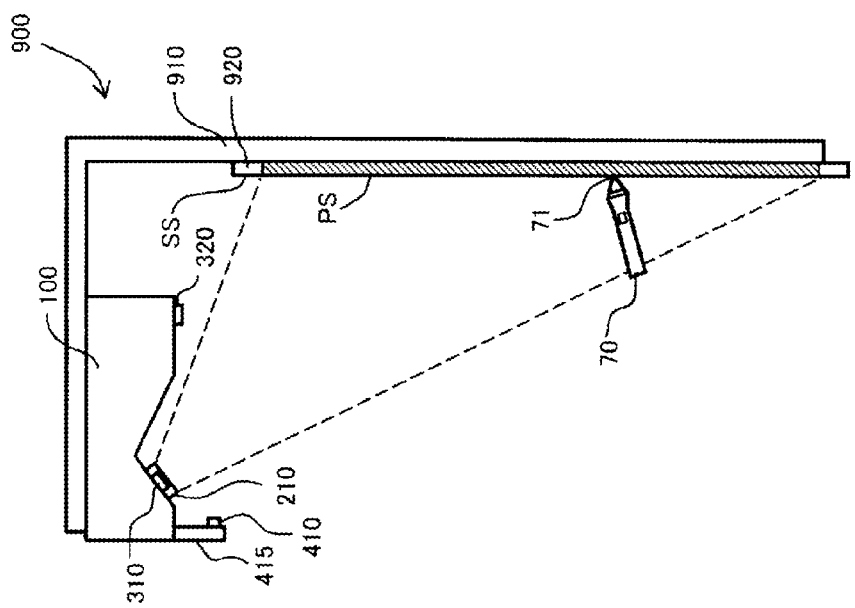

FIG. 2A is a side view of the interactive projection system 900, and FIG. 2B is a front view thereof. In the present specification, a direction along a horizontal direction of the screen surface SS is defined as an X direction, a direction along a vertical direction of the screen surface SS is defined as a Y direction, and a direction along a normal line of the screen surface SS is defined as a Z direction. It should be noted that the X direction is also referred to as a "horizontal direction," the Y direction is also referred to as a "vertical direction," and the Z direction is also referred to as an "anteroposterior direction" for the sake of convenience. Further, among directions along the Y direction (the vertical direction), the direction in which the projected screen PS is located viewed from the projector 100 is referred to as a "downward direction." It should be noted that in FIG. 2A, the range of the projected screen PS out of the screen plate 920 is provided with hatching for the sake of convenience of graphical description.

The projector 100 has a projection lens 210 for projecting the projected screen PS on the screen surface SS, a first camera 310 and a second camera 320 for taking images of the area of the projected screen PS, and a detection light irradiation section 410 for illuminating the pointing elements (the light-emitting pointing element 70 and the non-light-emitting pointing element 80) with the detection light. The detection light irradiation section 410 is provided to a support member 415 disposed on the front surface of the projector 100 so as to hang downward, and emits the detection light toward the area of the projected screen PS. As the detection light, near infrared light, for example, is used. The two cameras 310, 320 each have at least a first imaging function for receiving light in a wavelength region including the wavelength of the detection light to perform imaging. It is preferable for at least one of the two cameras 310, 320 to be further provided with a second imaging function for receiving light including visible light to perform imaging, and to be configured so as to be able to switch between these two imaging functions. For example, it is preferable for each of the two cameras 310, 320 to be provided with a near infrared filter switching mechanism (not shown) capable of placing a near infrared filter, which blocks visible light and transmits only the near infrared light, in front of a lens and retracting the near infrared filter from the front of the lens.

The example shown in FIG. 2B shows the state in which the interactive projection system 900 acts in a whiteboard mode. The whiteboard mode is a mode in which the user can arbitrarily draw a picture on the projected screen PS using the light-emitting pointing element 70 or the non-light-emitting pointing element 80. The projected screen PS including a toolbox TB is projected on the screen surface SS. The toolbox TB includes a cancel button UDB for undoing the process, a pointer button PTB for selecting a mouse pointer, a pen button PEB for selecting the pen tool for drawing an image, an eraser button ERB for selecting an eraser tool for erasing the image thus drawn, and forward/backward button FRB for feeding the screen forward or backward. By clicking these buttons using the pointing element, the user can perform processes corresponding to the respective buttons, or can select tools corresponding to the respective buttons. It should be noted that it is also possible to arrange that the mouse pointer is selected as a default tool immediately after starting up the system 900. In the example shown in FIG. 2B, there is described the appearance in which a line is being drawn in the projected screen PS by the user selecting the pen tool, and then moving the tip portion 71 of the light-emitting pointing element 70 within the projected screen PS in the state of having contact with the screen surface SS. The drawing of the line is performed by a projection image generation section (described later) inside the projector 100.

It should be noted that the interactive projection system 900 can act in other modes than the whiteboard mode. For example, this system 900 can also act in a PC interactive mode for displaying an image of the data, which has been transferred from a personal computer (not shown) via a communication line, on the projected screen PS. In the PC interactive mode, an image of the data of, for example, spreadsheet software is displayed, and it becomes possible to perform input, generation, correction, and so on of the data using a variety of tools and icons displayed in the image.

Figure 3:
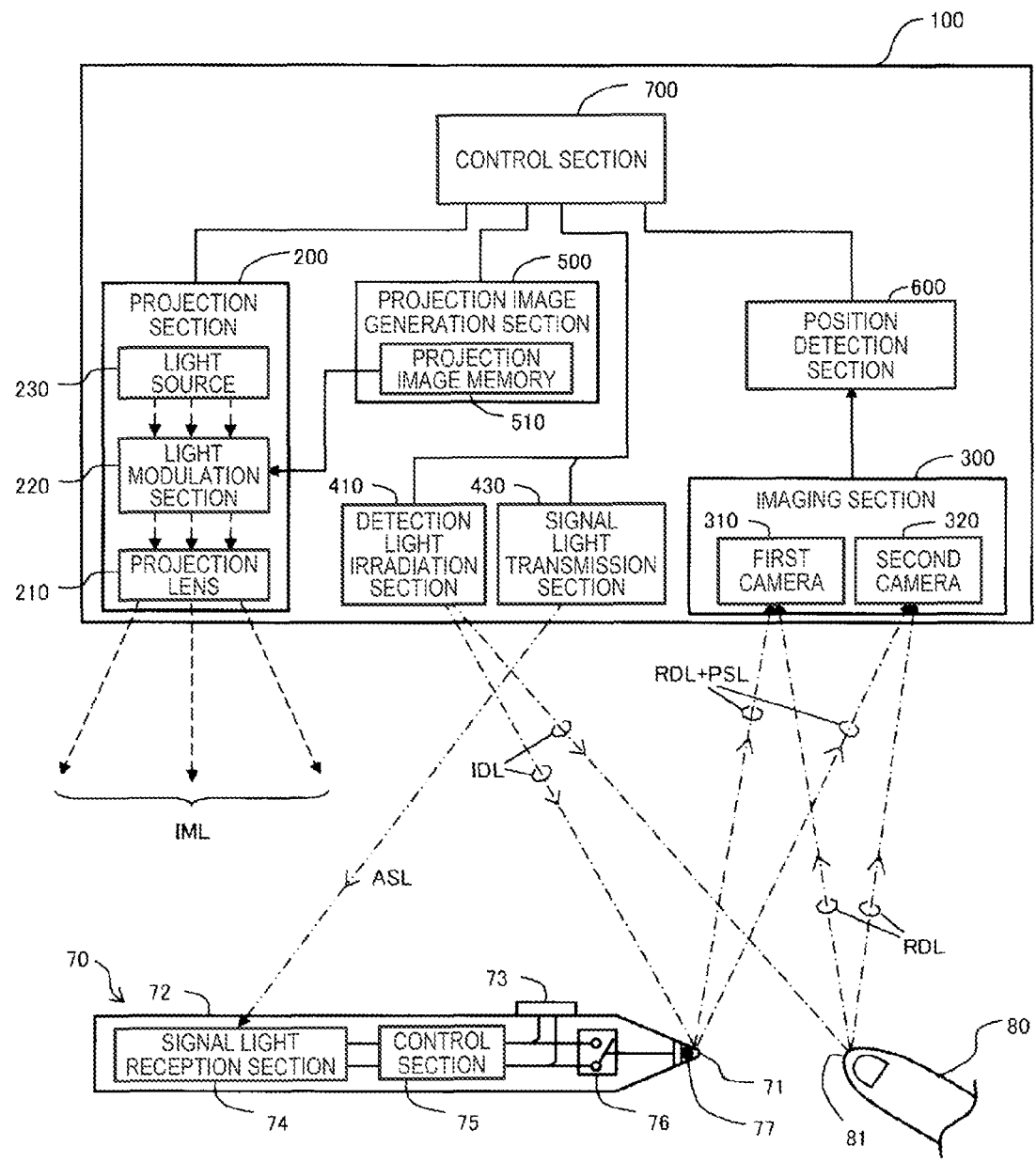
FIG. 3 is a block diagram showing an internal configuration of a projector and a light-emitting pointing element.

FIG. 3 is a block diagram showing the internal configuration of the interactive projector 100 and the light-emitting pointing element 70. The projector 100 has a control section 700, a projection section 200, a projection image generation section 500, a position detection section 600, an imaging section 300, the detection light irradiation section 410, and a signal light transmission section 430.

The control section 700 performs the control of each of the sections inside the projector 100. Further, the control section 700 determines the content of the instruction performed on the projected screen PS by the pointing element (the light-emitting pointing element 70 or the non-light-emitting pointing element 80) detected by the position detection section 600, and at the same time commands the projection image generation section 500 to generate or change the projection image in accordance with the content of the instruction.

The projection image generation section 500 has a projection image memory 510 for storing the projection image, and has a function of generating the projection image to be projected on the screen surface SS by the projection section 200. It is preferable for the projection image generation section 500 to further have a function as a keystone distortion correction section for correcting a keystone distortion of the projected screen PS (FIG. 2B).

The projection section 200 has a function of projecting the projection image, which has been generated by the projection image generation section 500, on the screen surface SS. The projection section 200 has a light modulation section 220 and a light source 230 besides the projection lens 210 explained with reference to FIGS. 2A and 2B. The light modulation section 220 modulates the light from the light source 230 in accordance with the projection image data provided from the projection image memory 510 to thereby form projection image light IML. The projection image light IML is typically color image light including the visible light of three colors of RGB, and is projected on the screen surface SS by the projection lens 210. It should be noted that as the light source 230, there can be adopted a variety of types of light source such as a light emitting diode or a laser diode, or the light source lamp such as a super-high pressure mercury lamp. Further, as the light modulation section 220, there can be adopted a transmissive or reflective liquid crystal panel, a digital mirror device, or the like, and it is also possible to adopt a configuration provided with a plurality of light modulation sections 220 for respective colored light beams.

The detection light irradiation section 410 irradiates throughout the screen surface SS and the space in front of the screen surface SS with irradiating detection light IDL for detecting the tip portion of the pointing element (the light-emitting pointing element 70 or the non-light-emitting pointing element 80). As the irradiating detection light IDL, near infrared light, for example, is used. The detection light irradiation section 410 is put on only in a predetermined period including imaging timing of the cameras 310, 320, and is put off in other periods. Alternatively, it is also possible to arrange that the detection light irradiation section 410 is always kept in the lighting state while the system 900 is in action.

The signal light transmission section 430 has a function of transmitting a device signal light ASL to be received by the light-emitting pointing element 70. The device signal light ASL is the near infrared signal for synchronization, and is periodically emitted from the signal light transmission section 430 of the projector 100 to the light-emitting pointing element 70. A tip light emitting section 77 of the light-emitting pointing element 70 emits pointing element signal light PSL (described later) as the near infrared light having a predetermined light emission pattern (light emission sequence) in sync with the device signal light ASL. Further, when performing the position detection of the pointing element (the light-emitting pointing element 70 or the non-light-emitting pointing element 80), the cameras 310, 320 of the imaging section 300 perform imaging at predetermined timings synchronized with the device signal light ASL.

The imaging section 300 has the first camera 310 and the second camera 320 explained with reference to FIGS. 2A and 2B. As described above, the two cameras 310, 320 each have the function of receiving light in a wavelength region including the wavelength of the detection light to perform imaging. In the example shown in FIG. 3, there is described the appearance in which the irradiating detection light IDL emitted by the detection light irradiation section 410 is reflected by the pointing element (the light-emitting pointing element 70 or the non-light-emitting pointing element 80), and then the reflected detection light RDL is received by the two cameras 310, 320 to be imaged. The two cameras 310, 320 further receives the pointing element signal light PSL, which is the near infrared light emitted from the tip light emitting section 77 of the light-emitting pointing element 70, to perform imaging. Imaging by the two cameras 310, 320 is performed in both of a first period, in which the irradiating detection light IDL emitted from the detection light irradiation section 410 is in an ON state (light-emitting state), and a second period in which the irradiating detection light IDL is in an OFF state (non-light-emitting state). It is possible for the position detection section 600 to determine which one of the light-emitting pointing element 70 and the non-light-emitting pointing element 80 each of the pointing elements included in the images corresponds to by comparing the images in the respective two types of periods with each other.

It should be noted that at least one of the two cameras 310, 320 preferably has a function of performing imaging using the light including the visible light in addition to a function of performing imaging using the light including the near infrared light. By adopting this configuration, it is possible to take images of the projected screen PS projected on the screen surface SS with the cameras, and then make the projection image generation section 500 perform the keystone distortion correction using the images. Since the method of the keystone distortion correction using one or more cameras is well known, the explanation thereof will be omitted here.

The position detection section 600 has a function of determining the three-dimensional position of the tip portion of the pointing element (the light-emitting pointing element 70 or the non-light-emitting pointing element 80) making use of triangulation using the images taken by the two cameras 310, 320. On this occasion, the position detection section 600 also determines which one of the light-emitting pointing element 70 and the non-light-emitting pointing element 80 each of the pointing elements in the images corresponds to using the light emission pattern of the light-emitting pointing element 70.

The light-emitting pointing element 70 is provided with a signal light reception section 74, a control section 75, a tip switch 76, and the tip light emitting section 77 besides the button switch 73. The signal light reception section 74 has a function of receiving a device signal light ASL emitted from the signal light transmission section 430 of the projector 100. The tip switch 76 is a switch to be set to an ON state when the tip portion 71 of the light-emitting pointing element 70 is pushed, and set to an OFF state when the tip portion 71 is released. The tip switch 76 is normally in the OFF state, and is set to the ON state due to the contact pressure when the tip portion 71 of the light-emitting pointing element 70 has contact with the screen surface SS. When the tip switch 76 is in the OFF state, the control section 75 makes the tip light emitting section 77 emit light with a specific first light emission pattern representing that the tip switch 76 is in the OFF state to thereby emit the pointing element signal light PSL having the first emission pattern. In contrast, when the tip switch 76 becomes in the ON state, the control section 75 makes the tip light emitting section 77 emit light with a specific second light emission pattern representing that the tip switch 76 is in the ON state to thereby emit the pointing element signal light PSL having the second emission pattern. Since the first light emission pattern and the second light emission pattern are different from each other, it is possible for the position detection section 600 to analyze the images taken by the two cameras 310, 320 to thereby determine whether the tip switch 76 is in the ON state or in the OFF state.

As described above, in the present embodiment, the contact determination on whether or not the tip section 71 of the light-emitting pointing element 70 has contact with the screen surface SS is performed in accordance with the ON/OFF state of the tip switch 76. Incidentally, since the three-dimensional position of the tip section 71 of the light-emitting pointing element 70 can be obtained by the triangulation using the images taken by the two cameras 310, 320, it is also possible to perform the contact determination of the tip portion 71 of the light-emitting pointing element 70 using the three-dimensional position. It should be noted that the detection accuracy of the Z coordinate (the coordinate in the normal direction of the screen surface SS) due to the triangulation is not necessarily high in some cases. Therefore, it is preferable to arrange that the contact determination is performed in accordance with the ON/OFF state of the tip switch 76 in the point that the contact determination can more accurately be performed.

The button switch 73 of the light-emitting pointing element 70 has the same function as that of the tip switch 76. Therefore, the control section 75 makes the tip light emitting section 77 emit light with the second light emission pattern described above in the state in which the user holds down the button switch 73, and makes the tip light emitting section 77 emit light with the first light emission pattern described above in the state in which the button switch 73 is not held down. In other words, the control section 75 makes the tip light emitting section 77 emit light with the second light emission pattern described above in the state in which at least one of the tip switch 76 and the button switch 73 is in the ON state, and makes the tip light emitting section 77 emit light with the first light emission pattern described above in the state in which both of the tip switch 76 and the button switch 73 are in the OFF state.

It should be noted that it is also possible to arrange that a different function from that of the tip switch 76 is assigned to the button switch 73. For example, in the case in which the same function as that of a right-click button of the mouse is assigned to the button switch 73, when the user holds down the button switch 73, an instruction of the right click is transmitted to the control section 700 of the projector 100, and the process corresponding to the instruction is executed. In the case in which the different function from that of the tip switch 76 is assigned to the button switch 73 as described above, the tip light emitting section 77 emits light with four light emission patterns different from each other in accordance with the ON/OFF state of the tip switch 76 and the ON/OFF state of the button switch 73. In this case, it is possible for the light-emitting pointing element 70 to make transmission to the projector 100 while distinguishing the four combinations of the ON/OFF states of the tip switch 76 and the button switch 73.

FIGS. 4A and 4B are explanatory diagrams showing an appearance of an operation using the light-emitting pointing element 70 and the non-light-emitting pointing element 80. In this example, both of the tip portion 71 of the light-emitting pointing element 70 and the tip portion 81 of the non-light-emitting pointing element 80 are separated from the screen surface SS. The X-Y coordinate $(X_{71}, Y_{71})$ of the tip portion 71 of the light-emitting pointing element 70 is located above the eraser button ERB of the toolbox TB. Further, here, the mouse pointer PT is selected as a tool for representing the function of the tip portion 71 of the light-emitting pointing element 70, and the mouse pointer PT is drawn in the projected screen PS so that the tip $OP_{71}$ of the mouse pointer PT exists on the eraser button ERB. As described above, the three-dimensional position of the tip portion 71 of the light-emitting pointing element 70 is determined by the triangulation using the images taken by the two cameras 310, 320. Therefore, on the projected screen PS, the mouse pointer PT is drawn so that the operation point $OP_{71}$ located at the tip of the mouse pointer PT is disposed at the position of the X-Y coordinate $(X_{71}, Y_{71})$ out of the three-dimensional coordinate $(X_{71}, Y_{71}, Z_{71})$ of the tip portion 71 determined by the triangulation. In other words, the tip $OP_{71}$ of the mouse pointer PT is disposed at the X-Y coordinate $(X_{71}, Y_{71})$ out of the three-dimensional coordinate $(X_{71}, Y_{71}, Z_{71})$ of the tip portion 71 of the light-emitting pointing element 70, and the instruction of the user is performed at this position. For example, it is possible for the user to select the eraser tool by holding down the button switch 73 of the light-emitting pointing element 70 in this state. As described above, in the present embodiment, even in the case in which the light-emitting pointing element 70 is in the state of being separated from the screen surface SS, it is possible to provide the instruction, which corresponds to the content of the projected screen PS in the operation point $OP_{71}$ located at the X-Y coordinate $(X_{71}, Y_{71})$ of the tip portion 71, to the projector 100 by holding down the button switch 73.

In FIG. 4B, the pen tool PE is further selected as the tool representing the function of the tip portion 81 of the non-light-emitting pointing element 80, and the pen tool PE is drawn on the projected screen PS. As described above, the three-dimensional position of the tip portion 81 of the non-light-emitting pointing element 80 is also determined by the triangulation using the images taken by the two cameras 310, 320. Therefore, on the projected screen PS, the pen tool PE is drawn so that the operation point $OP_{81}$ located at the tip of the pen tool PE is disposed at the position of the X-Y coordinate $(X_{81}, Y_{81})$ out of the three-dimensional coordinate $(X_{81}, Y_{81}, Z_{81})$ of the tip portion 81 determined by the triangulation. It should be noted that when the user provides the instruction to the projector 100 using the non-light-emitting pointing element 80, the instruction (e.g., drawing and selection of the tool) is performed in the state of making the tip portion 81 of the non-light-emitting pointing element 80 have contact with the projected screen PS.

In the example shown in FIGS. 4A and 4B, even in the case in which the tip portions of the pointing elements (the light-emitting pointing element 70 and the non-light-emitting pointing element 80) are separated from the projected screen PS, the tool (the mouse pointer PT or the pen tool PE) selected by each of the pointing elements is drawn on the projected screen PS to thereby be displayed. Therefore, there is an advantage that it is easy to understand what tools are selected by the pointing elements even in the case in which the user does not make the tip portions of the pointing elements have contact with the projected screen PS, and thus, the operation is easy. Further, since the tool is drawn so that the operation point OP of the tool is disposed at the position of the X-Y coordinate out of the three-dimensional coordinate of the tip portion of the pointing element, there is an advantage that the user can appropriately recognize the position of the tool in use.

It should be noted that the interactive projection system 900 can also be configured so that two or more light-emitting pointing elements 70 can simultaneously be used. In this case, the light emission patterns of the pointing element signal light PSL described above are preferably unique light emission patterns with which the two or more light-emitting pointing elements 70 can be identified. More specifically, in the case in which the N (N is an integer equal to or greater than 2) light-emitting pointing elements 70 can be used at the same time, the light emission patterns of the pointing element signal light PSL are preferably the patterns with which the N light-emitting pointing elements 70 can be distinguished from each other. It should be noted that in the case in which a plurality of unit light emission periods is included in a set of light emission patterns, two values, namely emission and non-emission, can be expressed in each of the unit light emission periods. Here, each of the unit light emission periods corresponds to the period for expressing 1-bit information, namely the ON/OFF state of the tip light emitting section 77 of the light-emitting pointing element 70. In the case in which the set of light emission patterns are each formed of M (M is an integer equal to or greater than 2) unit light emission periods, $2^M$ states can be distinguished by the set of light emission patterns. Therefore, it is preferable for the number M of the unit light emission periods constituting each of the set of light emission patterns to be set so as to fulfill the following formula.

$$N \times Q \leq 2^M \quad (1)$$

Here, Q is a number of the states distinguished by the switches 73, 76 of the light-emitting pointing element 70, and in the example of the present embodiment, Q=2 or Q=4 is set. For example, in the case of Q=4, it is preferable that if N=2, M is set to an integer equal to or greater than 3, and if N=3 through 4, M is set to an integer equal to or greater than 4. In this case, when the position detection section 600 (or the control section 700) identifies the N light-emitting pointing elements 70, and the states of the switches 73, 76 of each of the light-emitting pointing elements 70, the identification is performed using the M images taken in each of the cameras 310, 320 in the M unit light emission periods of the set of light emission patterns. It should be noted that the M-bit light emission patterns are the patterns of setting the pointing element signal light PSL to the ON state or the OFF state in the state of keeping the irradiating detection light IDL in the OFF state, and therefore the non-light-emitting pointing element 80 does not show in the images taken by the cameras 310, 320. Therefore, it is preferable to further add 1-bit unit light emission period with the irradiating detection light IDL set to the ON state in order to take images to be used for detecting the position of the non-light-emitting pointing element 80. It should be noted that in the unit light emission period for the position detection, the pointing element signal light PSL can be in either of the ON state and the OFF state. The images obtained in the unit light emission period for the position detection can also be used for the position detection of the light-emitting pointing elements 70.

The five specific examples of the signal light described in FIG. 3 are summed up as follows.

(1) Projection Image Light IML: the image light (visible light) projected on the screen surface SS by the projection lens 210 in order to project the projected screen PS on the screen surface SS.

(2) Irradiating Detection Light IDL: the near infrared light with which the detection light irradiation section 410 irradiates throughout the screen surface SS and the space in front of the screen surface SS for detecting the tip portions of the pointing elements (the light-emitting pointing element 70 and the non-light-emitting pointing element 80).

(3) Reflected Detection Light RDL: the near infrared light reflected by the pointing elements (the light-emitting pointing element 70 and the non-light-emitting pointing element 80), and then received by the two cameras 310, 320 out of the near infrared light emitted as the irradiating detection light IDL.

(4) Device Signal Light ASL: the near infrared light periodically emitted from the signal light transmission section 430 of the projector 100 in order to synchronize the projector 100 and the light-emitting pointing element 70 with each other.

(5) Pointing Element Signal Light PSL: the near infrared light emitted from the tip light emitting section 77 of the light-emitting pointing element 70 at the timing synchronized with the device signal light ASL. The light emission pattern of the pointing element signal light PSL is changed in accordance with the ON/OFF states of the switches 73, 76 of the light-emitting pointing element 70. Further, the unique light emission patterns for identifying the plurality of light-emitting pointing elements 70 are provided.

In the present embodiment, the position detection of the tip portions of the light-emitting pointing element 70 and the non-light-emitting pointing element 80, and the determination of the contents instructed by the light-emitting pointing element 70 and the non-light-emitting pointing element 80 are performed as follows.

General Description of Position Detection Method of Light-Emitting Pointing Element 70 and Determination Method of Instruction Contents The three-dimensional position $(X_{71}, Y_{71}, Z_{71})$ of the tip portion 71 of the light-emitting pointing element 70 is determined by the position detection section 600 due to the triangulation using the images taken by the two cameras 310, 320. On this occasion, whether or not the pointing element is the light-emitting pointing element 70 can be recognized by determining whether or not the light emission pattern of the tip light emitting section 77 appears in the images taken at a predetermined plurality of timings. Further, whether or not the tip portion 71 of the light-emitting pointing element 70 has contact with the screen surface SS (i.e., whether or not the tip switch 76 is in the ON state) can also be determined using the light emission pattern of the tip light emitting section 77 in the images taken at the plurality of timings described above. The position detection section 600 can further determine the content of the instruction in accordance with the ON/OFF states of the switches 73, 76, and the content of the projection screen surface SS at the X-Y coordinate $(X_{71}, Y_{71})$ of the tip portion 71 of the light-emitting pointing element 70. For example, as shown in FIG. 4B as an example, in the case in which the tip switch 76 becomes in the ON state in the state in which the position of the X-Y coordinate $(X_{71}, Y_{71})$ of the tip portion 71 is located on either of the buttons in the toolbox TB, the tool of that button is selected. Further, as shown in FIG. 2B as an example, if the X-Y coordinate $(X_{71}, Y_{71})$ of the tip portion 71 is located at a position outside the toolbox TB in the projected screen PS, the process (e.g., drawing) using the tool thus selected is selected. The control section 700 makes the projection image generation section 500 draw a pointer or a mark selected in advance so that the pointer or the mark is disposed at the position $(X_{71}, Y_{71})$ in the projected screen PS using the X-Y coordinate $(X_{71}, Y_{71})$ of the tip portion 71 of the light-emitting pointing element 70. Further, the control section 700 performs the process corresponding to the content instructed with the light-emitting pointing element 70, and then makes the projection image generation section 500 draw the image including the processing result.

General Description of Position Detection Method of Non-Light-Emitting Pointing Element 80 and Determination Method of Instruction Contents The three-dimensional position $(X_{81}, Y_{81}, Z_{81})$ of the tip portion 81 of the non-light-emitting pointing element 80 is also determined due to the triangulation using the images taken by the two cameras 310, 320. On this occasion, whether or not the pointing element is the non-light-emitting pointing element 80 can be recognized by determining whether or not the light emission pattern of the light-emitting pointing element 70 appears in the images taken at a predetermined plurality of timings. It should be noted that the positions of the tip portion 81 of the non-light-emitting pointing element 80 in the two images taken by the two cameras 310, 320 can be determined using a well known technology such as template matching or feature extraction. For example, in the case of recognizing the tip portion 81 of the non-light-emitting pointing element 80 as a finger using the template matching, the tip portion 81 of the finger can be recognized by preparing a plurality of templates related to the finger in advance, and then searching the images taken by the two cameras 310, 320 for the part matching these templates. Further, whether or not the tip portion 81 of the non-light-emitting pointing element 80 has contact with the screen surface SS can be determined in accordance with whether or not the difference between the Z coordinate value of the tip portion 81 determined by the triangulation and the Z coordinate value of the screen surface SS is equal to or smaller than a minute allowable tolerance, namely whether or not the tip portion 81 is sufficiently close to the screen surface SS. As the allowable tolerance, it is preferable to use a small value in a range of, for example, about 2 mm through 6 mm. Further, in the case in which the position detection section 600 determines that the tip portion 81 of the non-light-emitting pointing element 80 has contact with the screen surface SS, the position detection section 600 determines the instruction content in accordance with the content of the projection screen surface SS at the contact position. The control section 700 makes the projection image generation section 500 draw a pointer or a mark selected in advance so that the pointer or the mark is disposed at the position $(X_{81}, Y_{81})$ in the projected screen PS using the X-Y coordinate $(X_{81}, Y_{81})$ of the tip of the non-light-emitting pointing element 80 detected by the position detection section 600. Further, the control section 700 performs the process corresponding to the content instructed with the non-light-emitting pointing element 80, and then makes the projection image generation section 500 draw the image including the processing result.

B. Detection Light Irradiation Section in Comparative Example and Embodiment

Figure 5A:
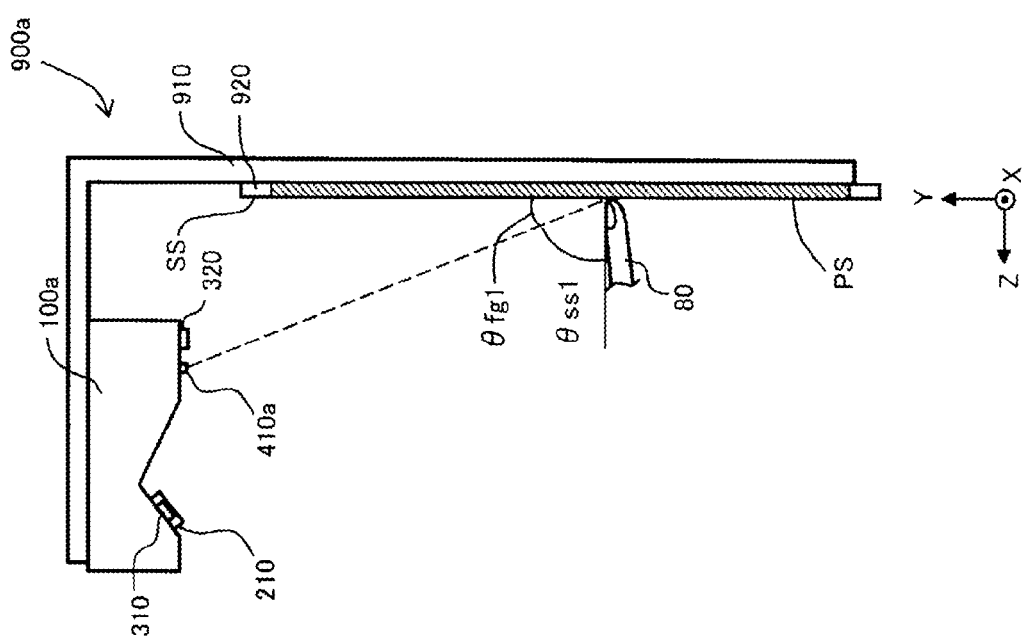
FIGS. 5A and 5B are explanatory diagrams showing an irradiation state with detection light in a comparative example.
Figure 5B:
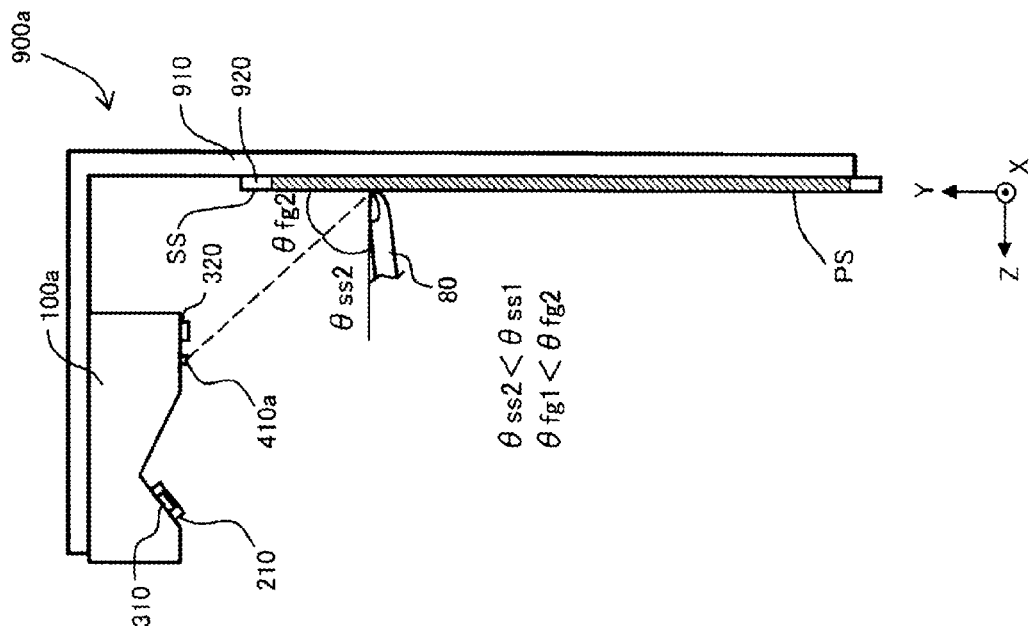

FIGS. 5A and 5B are explanatory diagrams each showing the irradiation state of the detection light in a system 900a according to the comparative example. In the system 900a according to the comparative example, a detection light irradiation section 410a is disposed on the lower surface of a main body of a projector 100a, and is disposed at a position closer to the projected screen PS compared to the embodiment shown in FIGS. 4A and 4B. Here, there are shown incident angles $\theta_{ss}$, $\theta_{fg}$ of the detection light IDL, which have been emitted from a detection light irradiation section 410a, with respect to the projected screen PS and the non-light-emitting pointing element 80, respectively. FIG. 5A shows the case in which the non-light-emitting pointing element 80 is located in a relatively lower area of the projected screen PS, and FIG. 5B shows the case in which the non-light-emitting pointing element 80 is located in a relatively upper area of the projected screen PS. In these drawings, there are shown the incident angles $\theta_{ss}$, $\theta_{fg}$ of the detection light IDL at the position of the tip of the non-light-emitting pointing element 80. The incident angles $\theta_{ss}$, $\theta_{fg}$ are the angles with respect to the normal line of the targeted incidence plane. In the incident angle $\theta_{ss}$ of the detection light IDL with respect to the projected screen PS, the incident angle $\theta_{ss2}$ obtained in the case in which the non-light-emitting pointing element 80 is located in the upper area is smaller than the incident angle $\theta_{ss1}$ obtained in the case in which the non-light-emitting pointing element 80 is located in the lower area. In contrast, in the incident angle $\theta_{fg}$ of the detection light IDL with respect to the non-light-emitting pointing element 80, the incident angle $\theta_{fg2}$ obtained in the case in which the non-light-emitting pointing element 80 is located in the upper area is larger than the incident angle $\theta_{fg1}$ obtained in the case in which the non-light-emitting pointing element 80 is located in the lower area. These relationships are expressed as the following formulas.

$$\theta_{ss2} < \theta_{ss1} \tag{2a}$$

$$\theta_{fg1} < \theta_{fg2} \tag{2b}$$

In contrast, the intensity of the reflected light from the projected screen PS and the non-light-emitting pointing element 80 can be expressed as the following formulas.

$$R_{ss} = k_{ss} \times \cos \theta_{ss} \tag{3a}$$

$$R_{fg} = k_{fg} \times \cos \theta_{fg} \tag{3b}$$

Here, $R_{ss}$ denotes the intensity of the reflected light from the projected screen PS (i.e., the screen surface SS), $k_{ss}$ denotes the reflectance of the detection light IDL on the screen surface SS, $\theta_{ss}$ denotes the incident angle of the detection light IDL with respect to the projected screen PS. Further, $R_{fg}$ denotes the intensity of the reflected light from the non-light-emitting pointing element 80, $k_{fg}$ denotes the reflectance of the detection light IDL on the non-light-emitting pointing element 80, $\theta_{fg}$ denotes the incident angle of the detection light IDL with respect to the non-light-emitting pointing element 80. It should be noted that although the intensity of the reflected light is actually inverse proportional to the square of the distance, since the distances in the both cases can be assumed to approximately be equal to each other, the influence of the distance is omitted in the formulas (3a), (3b). Since the incident angles $\theta_{ss}$, $\theta_{fg}$ each have a value in a range of 0 through 90 degrees, the larger the incident angles $\theta_{ss}$, $\theta_{fg}$ are, the smaller the reflected light intensities $R_{ss}$, $R_{fg}$ becomes.

As is obvious from the formulas (2a), (2b) and the formulas (3a), (3b) described above, as the non-light-emitting pointing element 80 moves upward from the lower area, the incident angle $\theta_{ss}$ with respect to the projected screen PS decreases and the intensity $R_{ss}$ of the reflected light from the projected screen PS increases, and in contrast, the incident angle $\theta_{fg}$ with respect to the non-light-emitting pointing element 80 increases and the intensity $R_{fg}$ of the reflected light from the non-light-emitting pointing element 80 decreases. Therefore, in the images obtained by imaging the reflected light of the detection light IDL with the cameras 310, 320, there is a possibility that the brightness relationship between the non-light-emitting pointing element 80 and the projected screen PS as the background of the non-light-emitting pointing element 80 is reversed between the lower area and the upper area in the projected screen PS.

Figure 6B:
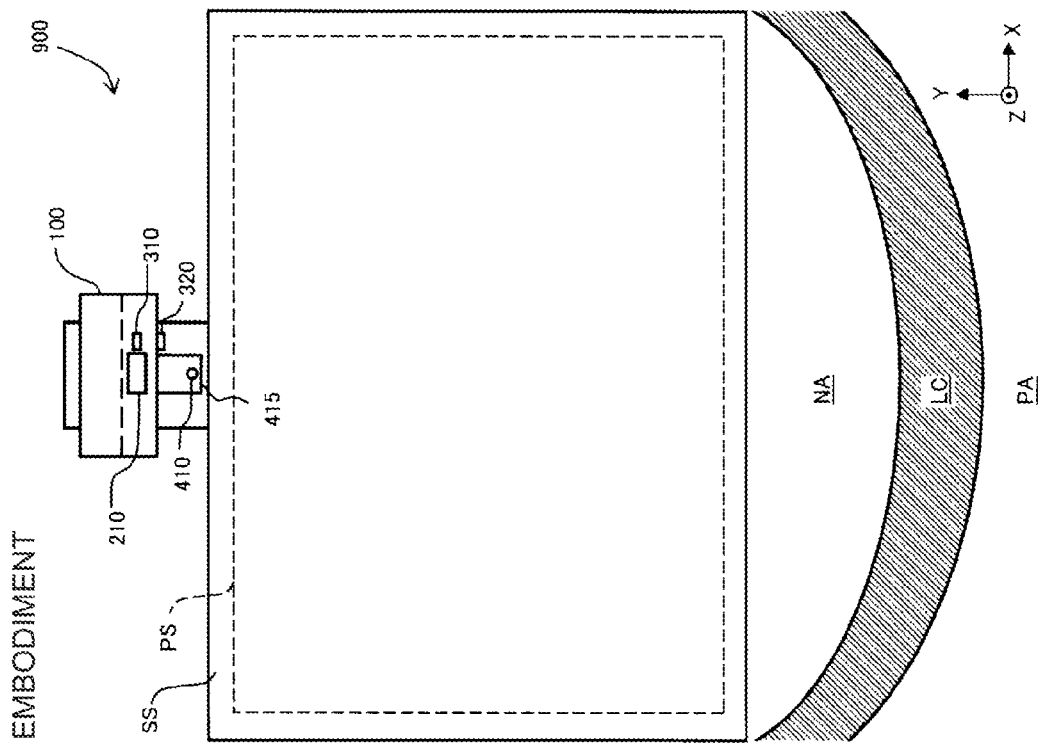
FIGS. 6A and 6B are explanatory diagrams showing the contrast in the comparative example and the contrast in the embodiment in a comparative manner.
Figure 6A:
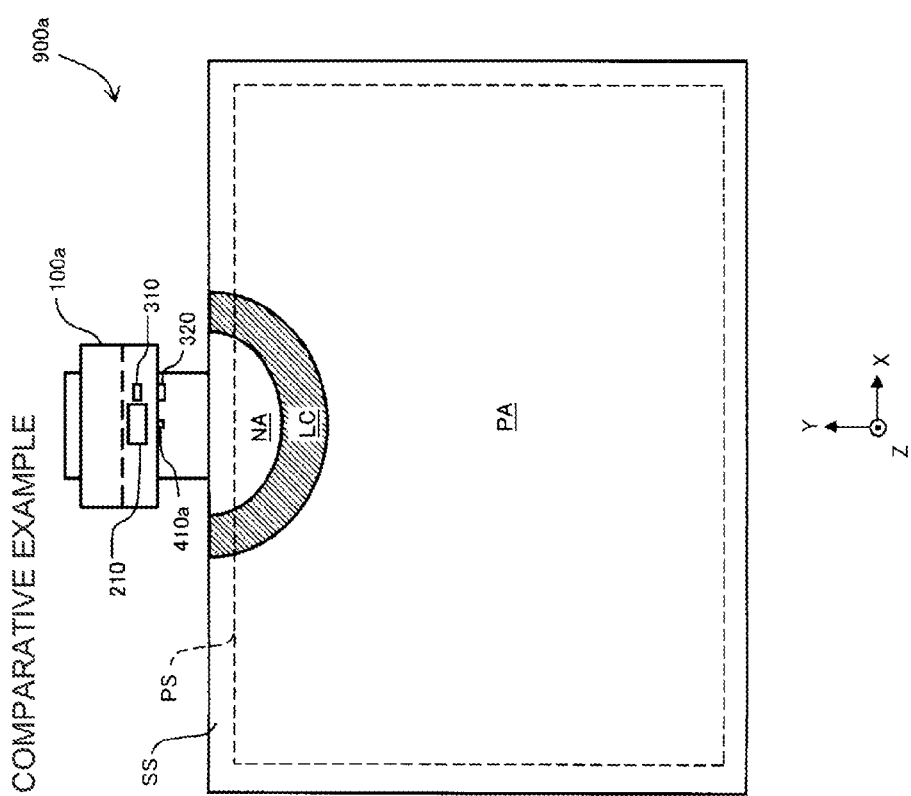

FIGS. 6A and 6B are explanatory diagrams showing the contrast between the projected screen PS and the non-light-emitting pointing element 80 in the comparative example and the embodiment in a comparative manner. FIG. 6A shows a distribution of the contrast of the image obtained by imaging the reflected light with the camera 310 in the case of emitting the detection light from the detection light irradiation section 410a of the comparative example. In this example, a positive contrast area PA exists in a lower part of the projected screen PS, a negative contrast area NA exists in an upper part of the projected screen PS, and a low contrast area LC exists in between. Here, the "positive contrast area PA" denotes the area where the non-light-emitting pointing element 80 is brighter than the projected screen PS, and the contrast becomes higher than a threshold value set in advance. Further, the "negative contrast area NA" denotes the area where the non-light-emitting pointing element 80 is darker than the projected screen PS, and the contrast becomes higher than the threshold value set in advance. The "low contrast area LC" denotes the area where the contrast between the non-light-emitting pointing element 80 and the projected screen PS is equal to or lower than the threshold value. It should be noted that the threshold value is a value set in advance for distinguishing the non-light-emitting pointing element 80 from the projected screen PS in the image, and is experimentally or empirically set in advance in accordance with the distinguishing method. It should be noted that in either of the positive contrast area PA and the negative contrast area NA, the contrast between the non-light-emitting pointing element 80 and the projected screen PS becomes sufficiently high, and therefore, it is possible to distinguish the non-light-emitting pointing element 80 from the projected screen PS. In contrast, in the low contrast area LC, since the contrast between the non-light-emitting pointing element 80 and the projected screen PS is low, it is difficult to distinguish the non-light-emitting pointing element 80 from the projected screen PS. Therefore, in the present comparative example, there is a possibility that the non-light-emitting pointing element 80 cannot be distinguished from the projected screen PS in the low contrast area LC.

FIG. 6B shows a distribution of the contrast of the image obtained by imaging the reflected light with the camera 310 in the case of emitting the detection light from the detection light irradiation section 410 of the embodiment. In the present embodiment, the entire area of the projected screen PS is the negative contrast area NA, and the low contrast area LC and the positive contrast area PA exist at positions on the lower side of the projected screen PS. In other words, in FIG. 6B, the negative contrast area NA in the upper part in the area of the projected screen PS spreads wider compared to the negative contrast area NA shown in FIG. 6A. The reason therefor is that the detection light irradiation section 410 of the embodiment is longer in vertical distance from the projected screen PS than the detection light irradiation section 410a of the comparative example, and is therefore smaller in the incident angle $\theta_{ss}$ of the detection light IDL with respect to the projected screen PS, and larger in the incident angle $\theta_{fg}$ with respect to the non-light-emitting pointing element 80. Further, since the detection light irradiation section 410 of the embodiment irradiates the projected screen PS from a lower position compared to the detection light irradiation section 410a of the comparative example, the effect described above is more conspicuous.

In the embodiment shown in FIG. 6B, the detection light irradiation section 410 is disposed so that the low contrast area LC does not exist in the area of the projected screen PS, and the negative contrast area NA covers the entire area of the projected screen PS. As a result, it is possible to distinguish the non-light-emitting pointing element 80 from the projected screen PS in the state in which the tip of the non-light-emitting pointing element 80 has contact with an arbitrary position in the projected screen PS. Further, the light-emitting pointing element 70 can also be distinguished from the projected screen PS in substantially the same manner. It should be noted that it is also possible to dispose the detection light irradiation section 410 so that the positive contrast area PA covers the entire area of the projected screen PS instead of the negative contrast area NA.

Regarding the images taken by the camera 320, there appear roughly the same distributions of the contrast areas as shown in FIG. 6B. It should be noted that since in the present embodiment, the perpendicular distances of the two cameras 310, 320 from the projected screen PS are different from each other, the distribution of the contrast areas is different between the images respectively taken by the two cameras 310, 320. It should be noted that it is preferable that the detection light irradiation section 410 is disposed so that the low contrast area LC does not exist in the area of the projected screen PS, and the negative contrast area NA (or the positive contrast area PA) covers the entire area of the projected screen PS also in the images taken by the camera 320 similarly to FIG. 6B. It should be noted that it is also possible to dispose the two cameras 310, 320 so that the perpendicular distances of the two cameras 310, 320 from the projected screen PS becomes equal to each other.

Figure 7:
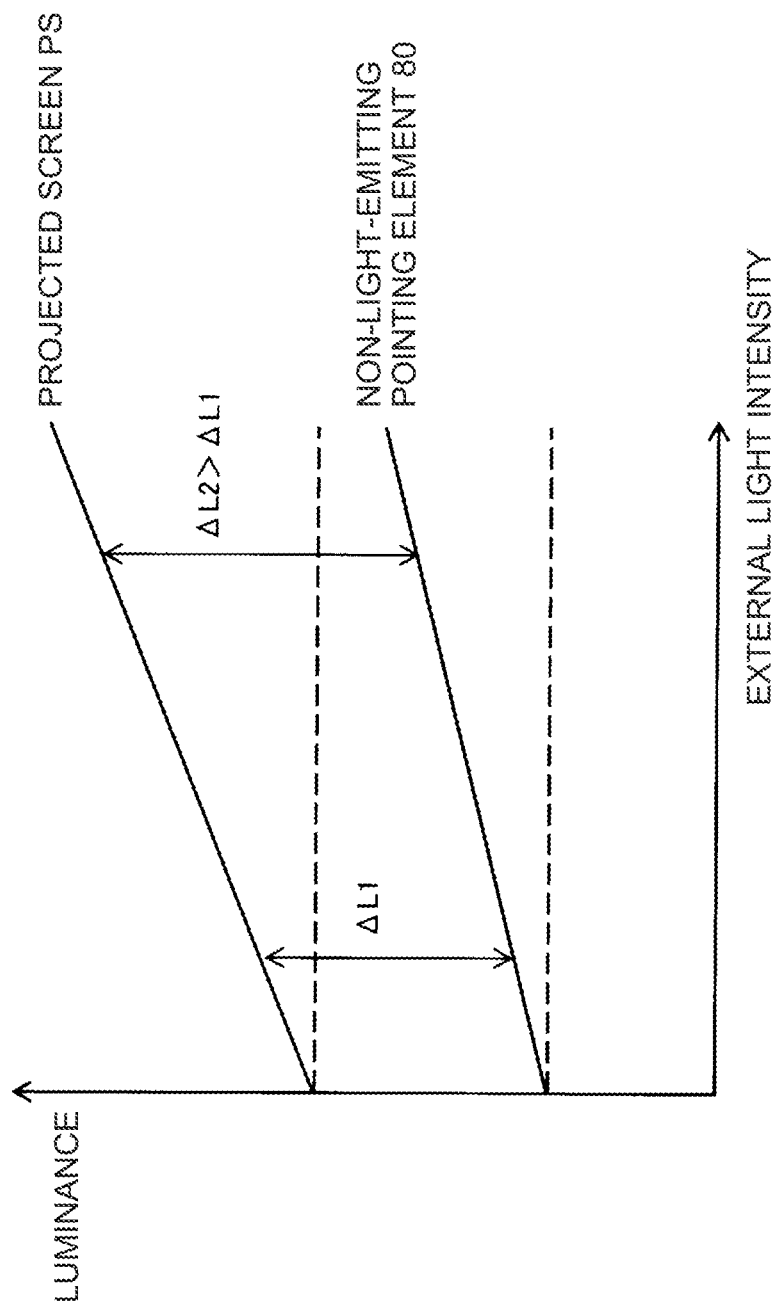
FIG. 7 is an explanatory diagram showing a variation in luminance of a projected screen and a non-light-emitting pointing element by external light intensity.

FIG. 7 is an explanatory diagram showing a variation in luminance of the projected screen PS and the non-light-emitting pointing element 80 by external light intensity. The horizontal axis of FIG. 7 represents the external light intensity (the intensity of the external light), and the vertical axis represents the luminance in the images taken by the cameras 310, 320. Here, the external light is light including the wavelength of the detection light, and is typically the sunlight. Further, FIG. 7 shows the characteristics obtained in the case in which the projected screen PS is irradiated with the external light along a direction downward from the upper side of the projected screen PS among the directions parallel to the Y-Z plane at the incident angle of 45 degrees. The state in which the external light intensity is zero corresponds to the state in which light other than the light emitted by the projector 100 does not enter the surface of the projected screen PS.

In the example shown in FIG. 7, there can be obtained an image in which the projected screen PS (i.e., the screen surface SS) is brighter than the non-light-emitting element 80 irrespective of the external light intensity. Further, a luminance difference ΔL2 between the projected screen PS and the non-light-emitting element 80 obtained in the case in which the external light intensity is high is greater than a luminance difference ΔL1 in the case in which the external light intensity is low. Therefore, the contrast is higher in the case in which the external light exists than in the case in which the external light does not exist. Further, the higher the external light intensity is, the higher the contrast between the projected screen PS and the non-light-emitting element 80 becomes. Such a characteristic can be implemented by, for example, selecting the material of the screen surface SS so that the reflectance of the detection light IDL on the screen surface SS takes a sufficiently high value than the reflectance on the non-light-emitting element 80 (typically a finger). Further, in general, the incident angle of the external light with respect to the projected screen PS is equal to or lower than 45 degrees, and further, the smaller the incident angle is, the brighter the projected screen PS becomes due to the external light, and therefore, the characteristic shown in FIG. 7 is apt to be further enhanced due to the external light.

In the case in which the characteristic shown in FIG. 7 can be obtained, as explained with reference to FIG. 6B, it is preferable that the detection light irradiation section 410 is disposed so that the negative contrast area NA covers the entire area of the projected screen PS. By adopting this configuration, it is possible to distinguish the non-light-emitting pointing element 80 from the projected screen PS in the state in which the tip of the non-light-emitting pointing element 80 has contact with an arbitrary position in the area of the projected screen PS irrespective of the presence or absence and the intensity of the external light.

As described above, in the present embodiment, the first contrast between the pointing element and the projected screen PS becomes lower than a threshold value set in advance for distinguishing the pointing element from the projected screen PS in the image taken in the state in which the tip of the pointing element (the light-emitting pointing element 70 or the non-light-emitting pointing element 80) has contact with at least one position (the low contrast area LC shown in FIG. 6B) located outside the projected screen PS on the same plane as the projected screen PS. In contrast, the detection light irradiation section 410 is disposed so that the second contrast between the pointing element and the projected screen PS becomes higher than the threshold value set in advance for distinguishing the pointing element from the projected screen PS in the image taken in the state in which the tip of the pointing element (the light-emitting pointing element 70 or the non-light-emitting pointing element 80) has contact with an arbitrary position in the projected screen PS. As a result, it is possible to distinguish the pointing element (the non-light-emitting pointing element 80 or the light-emitting pointing element 70) from the projected screen PS in the arbitrary position in the area of the projected screen PS.

MODIFIED EXAMPLES

It should be noted that the invention is not limited to the specific examples and the embodiment described above, but can be put into practice in various forms within the scope or the spirit of the invention, and the following modifications, for example, are also possible.

Modified Example 1

Although in the embodiment described above, it is assumed that the imaging section 300 includes the two cameras 310, 320, the imaging section 300 can also include three or more cameras. In the latter case, the three-dimensional coordinate (X, Y, Z) is determined based on m (m is an integer equal to or greater than 3) images taken by the m cameras. For example, it is possible to obtain the three-dimensional coordinates using $_mC_2$ combinations obtained by arbitrarily selecting two images out of the m images, and then obtain the final three-dimensional coordinate using the average value of the three-dimensional coordinates. By adopting this configuration, the detection accuracy of the three-dimensional coordinate can further be improved.

Modified Example 2

Although in the embodiments described above, it is assumed that the interactive projection system 900 can act in the whiteboard mode and the PC interactive mode, the system can also be configured so as to act in either one of the modes. Further, it is also possible for the interactive projection system 900 to be configured so as to act only in other modes than these two modes, or further to be configured so as to be able to act in a plurality of modes including these two modes.

Modified Example 3

Although in the embodiments described above it is assumed that the irradiating detection light IDL, the reflected detection light RDL, the device signal light ASL, and the pointing element signal light PSL shown in FIG. 3 are all the near infrared light, it is also possible to assume that some or all of these types of light are light other than the near infrared light.

Modified Example 4

Although in the embodiments described above, it is assumed that the projected screen is projected on the screen plate 920 having a plane shape, it is also possible to be assumed that the projected screen is projected on screen having a curved shape. In this case, since the three-dimensional position of the tip portion of the pointing element can be determined utilizing triangulation using the images taken by the two cameras, it is possible to determine the positional relationship between the tip portion of the pointing element and the projected screen.

Although the embodiment of the invention is hereinabove explained based on some specific examples, the embodiment of the invention described above is only for making it easy to understand the invention, but not for limiting the scope of the invention. It is obvious that the invention can be modified or improved without departing from the scope of the invention and the appended claims, and that the invention includes the equivalents thereof.

What is claimed is:

1. An interactive projector capable of receiving an instruction of a user to a projected screen with a pointing element, comprising:
   a projection section adapted to project the projected screen on a screen surface;
   a detection light irradiation section adapted to emit detection light used for detection of the pointing element toward an area of the projected screen;
   an imaging section adapted to receive light in a wavelength range including a wavelength of the detection light to take an image of the area of the projected screen; and a position detection section adapted to detect a position of the pointing element with respect to the projected screen based on an image, which is taken by the imaging section and includes the pointing element, wherein the detection light irradiation section is disposed so that (i) in a case in which the detection light is emitted from the detection light irradiation section in a state in which a tip of the pointing element has contact with at least one position located outside the projected screen on a same plane as the projected screen, first contrast between the pointing element and an area outside the projected screen in an image taken by the imaging section is lower than a threshold value set in advance for distinguishing the pointing element from the projected screen, and (ii) in a case in which the detection light is emitted from the detection light irradiation section in a state in which the tip of the pointing element has contact with an arbitrary position in the projected screen, second contrast between the pointing element and the area of the projected screen in the image taken by the imaging section is higher than a threshold value set in advance for distinguishing the pointing element from the projected screen.

2. The interactive projector according to claim 1, wherein the second contrast is contrast representing a state in which the area of the projected screen is brighter than the pointing element in the image taken by the imaging section, and the detection light irradiation section is disposed so that the second contrast becomes higher in a case of irradiating the projected screen with external light including a wavelength of the detection light than in a case in which the external light is absent.

3. The interactive projector according to claim 1, wherein the detection light is near infrared light.

4. An interactive projecting system comprising:

the interactive projector according to claim 1;

a screen having a screen surface on which the projected screen is projected.

* * * * *